United States Patent [19]
Gaines et al.
[11] 3,981,065
[45] Sept. 21, 1976

[54] METHOD AND APPARATUS FOR ASSEMBLY OF BEARING BUSHING

[75] Inventors: Donald R. Gaines, Farmington; Jon M. Smallegan, Ann Arbor; William H. Trudeau, Brighton, all of Mich.

[73] Assignee: Gulf & Western Manufacturing Company, Southfield, Mich.

[22] Filed: Sept. 10, 1975

[21] Appl. No.: 612,016

[52] U.S. Cl. .................... 29/450; 29/235
[51] Int. Cl.[2] .................... B23P 11/02
[58] Field of Search .................... 29/235, 450, 451

[56] References Cited

UNITED STATES PATENTS

| | | | |
|---|---|---|---|
| 46,464 | 2/1865 | Grant | 29/235 X |
| 2,550,564 | 4/1951 | Hutton | 29/235 |
| 2,632,236 | 3/1953 | Dodge | 29/235 X |
| 2,824,362 | 2/1958 | Myers | 29/235 |
| 2,840,893 | 7/1958 | Peppercorn | 29/235 |
| 2,877,543 | 3/1959 | Myers | 29/235 |
| 3,073,016 | 1/1963 | Drake | 29/235 |
| 3,319,325 | 5/1967 | Nessamar et al. | 29/451 X |
| 3,777,358 | 12/1973 | Matievich | 29/450 |

*Primary Examiner*—Charlie T. Moon
*Attorney, Agent, or Firm*—Barnes, Kisselle, Raisch & Choate

[57] ABSTRACT

A method and apparatus for assembling a hollow rubber bushing between two radially spaced elements of a bearing. The final space to be occupied by the bearing is considerably smaller than the "at rest" dimension of the bushing. It is necessary to provide a radial compression during movement of the inner member into the proper position. The apparatus provides for a positive support for the outer bearing member and a positive but retractable support for the bushing, the retractable support being cammed away from the center of the assembly as the carrying element for the inner bearing member is forced through the bushing while expanding the bushing radially to receive the inner bearing member.

5 Claims, 4 Drawing Figures

METHOD AND APPARATUS FOR ASSEMBLY OF BEARING BUSHING

This invention relates to a method and apparatus for assembly of a hollow bushing between two radially spaced bearing elements.

The problem of assembling metal bearing shafts and soft bushings has been before the art for quite some years. A U.S. Pat. to Grant No. 46,464 (1865), illustrates assembly of a roller arbor within a rubber roll. Additional U.S. Patents directed to the problem include: Thiry No. 1,961,536 (1934), Dodge No. 2,457,647 (1948) and Grotenhuis No. 2,468,311 (1949).

One of the difficulties surrounding the assembly of the soft bushings within the metal confines of a bearing has been the scuffing or tearing of the bushing in assembly. This occurs not only in the external confining of the bushing during assembly but also in the frictional contact due to the relative motion of the parts.

It is, therefore, an object of the present invention to provide a system for assembly which permits easy change of dimension required for assembly.

It is a further object to provide a system for bushing assembly which distributes the material of the bushing evenly around the circumference of the assembly and minimizes distortion at the ends.

It is also an object of the invention to provide a method and apparatus for bushing assembly which eliminates extrusion and trapping of portions of the bushing between parts of the assembling apparatus, thus causing tearing or uneven distribution of the material.

Other objects and features of the invention relating to details of construction and operation will be apparent in the following description and claims in which details of the steps of the method and of the apparatus are set forth in connection with the best mode presently contemplated for the practice of the invention.

Figure 1:
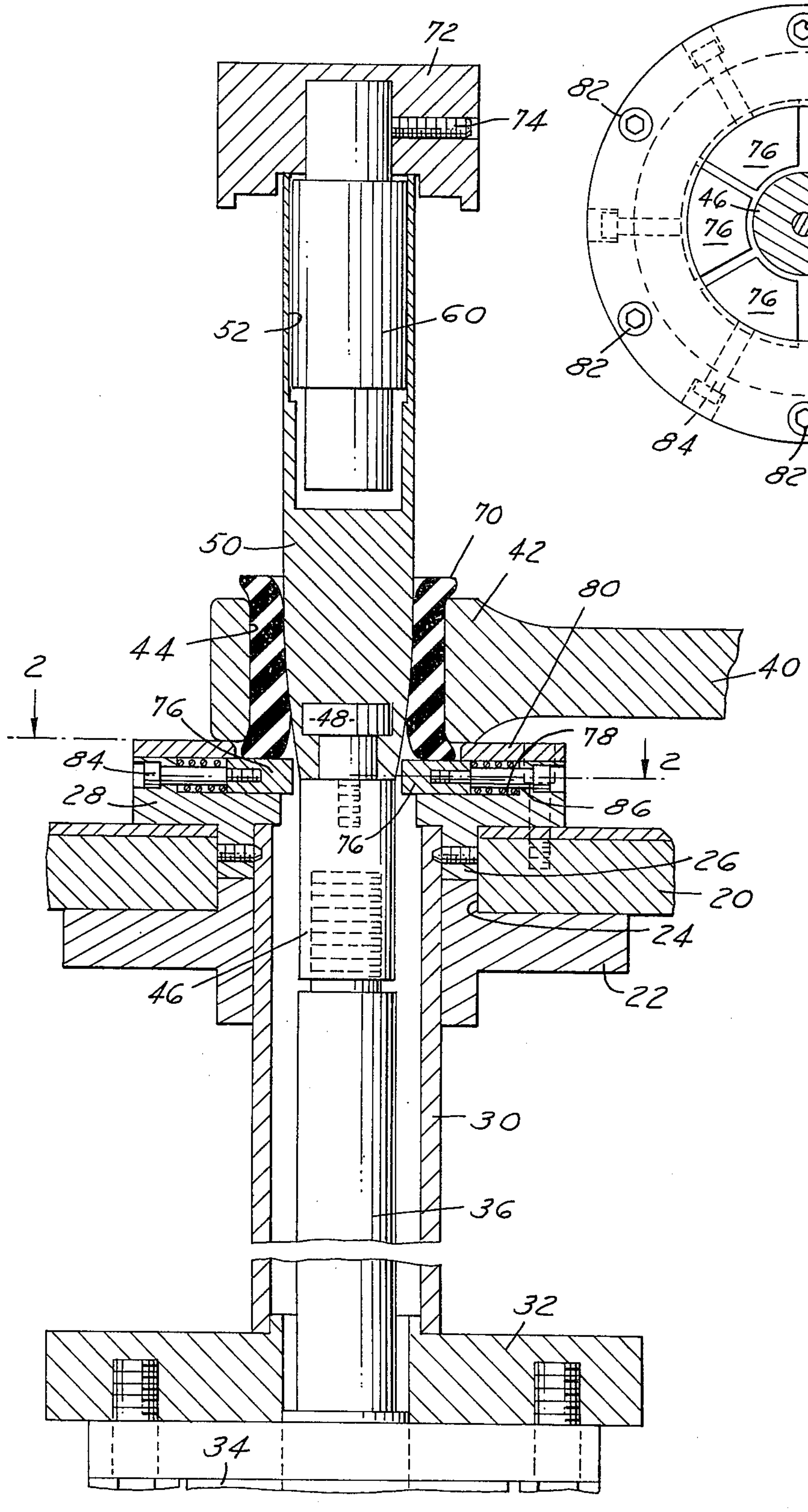

Drawings accompany the disclosure and the various views thereof may be briefly described as:

FIG. 1, a view of the initial stage of the assembly.

Figure 2:
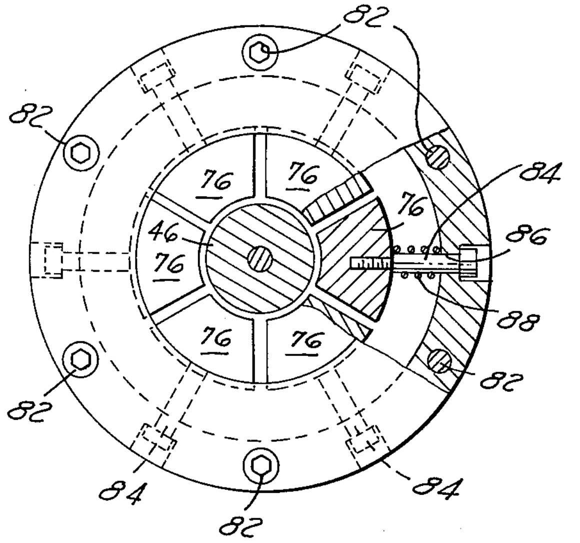

FIG. 2, a sectional view on line 2—2 of FIG. 1.

Figure 3:
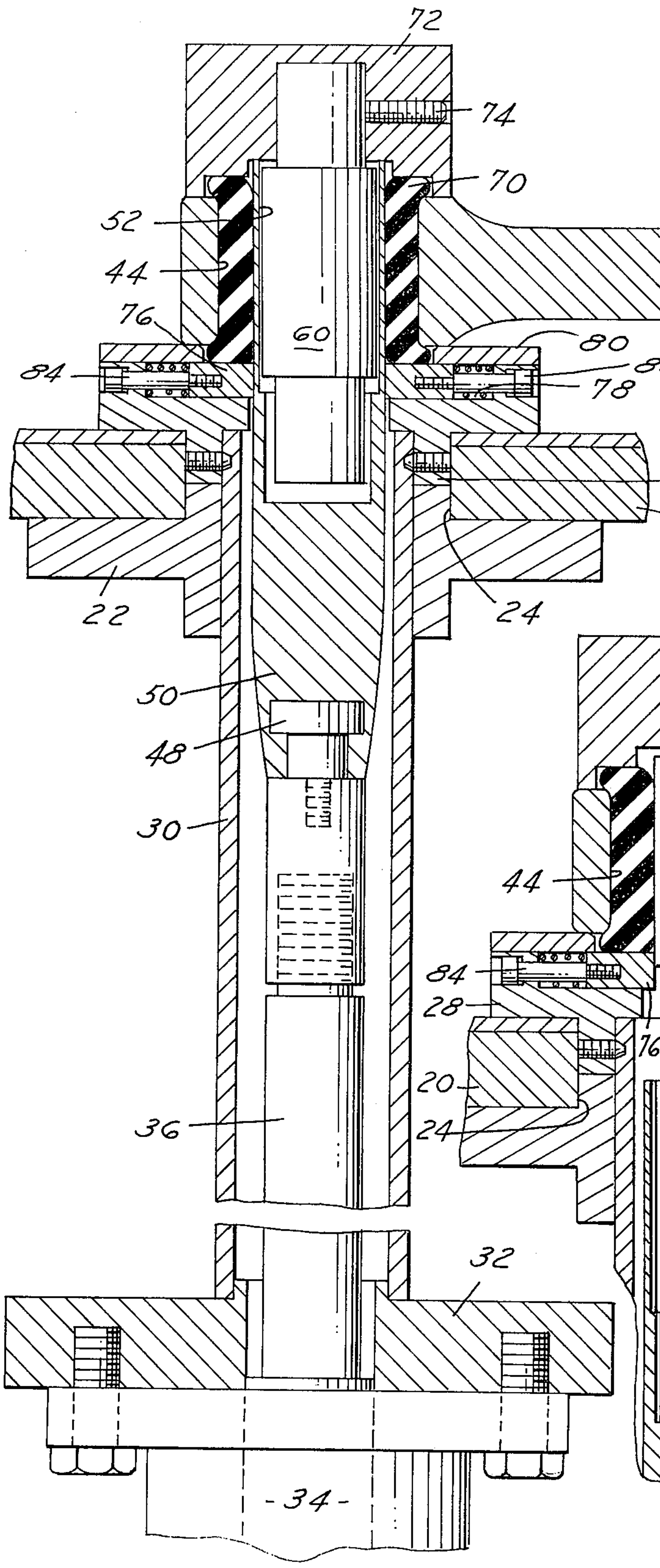

FIG. 3, a view of a second stage in the process of assembly.

Figure 4:
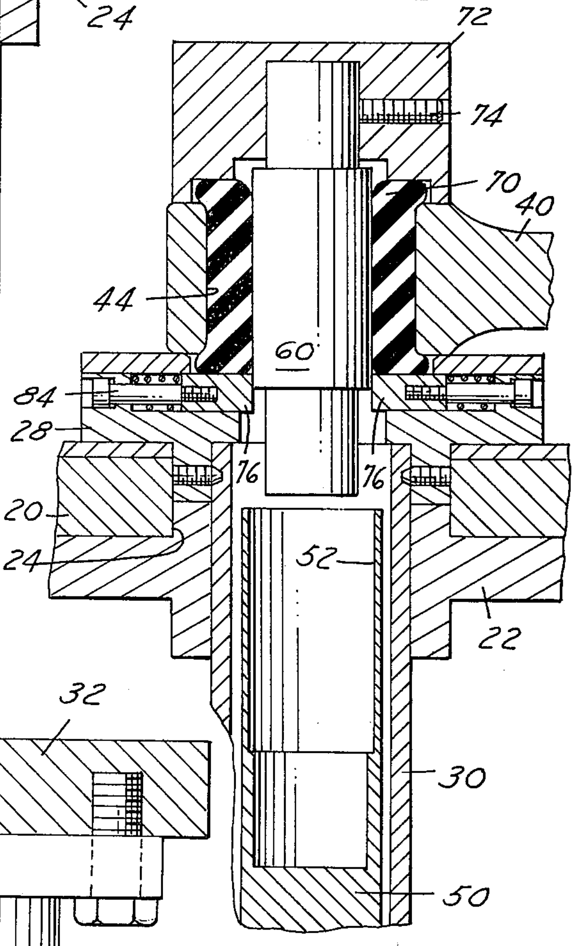

FIG. 4, a view of a final stage in the assembly.

With reference to the drawings, in FIG. 1, a supporting plate 20 carries support ring 22 suitably bolted by bolts (not shown) to the plate 20. The support ring has an annular portion which fits into an opening 24 in the plate 20 and this opening also receives an annular portion 26 of a top support ring 28, the details of which will be described later.

Suspended and secured to the annular portion 26 of the top ring 28 is a depending tube 30 which has fastened at the lower end a cylinder head 32 for a power cylinder 34 containing a piston (not shown) connected to a pull rod 36.

Above the top support ring 28 is an arm 40 of a part suitably supported on the plate 20 by a means (not shown). This arm has at its digital end 42 a recess 44 as a part of a joint mechanism to be loaded with a suitable bushing and an internal joint arbor. For example, the device might be a torque rod for a vehicle or any portion of the suspension or steering mechanism. The top end of the piston rod 36 has a stub shaft 46 threaded thereon and on the top of this is a small lug unit 48 which serves as one element of a quick T-slot connect-disconnect fastener for a bullet-shaped insertion and expander shuttle 50. This shuttle has a top recess 52 which carries the arbor 60 to be introduced into a bearing element 70 contained in the torque rod end 42.

At the top of the shuttle 50 is a stop cap 72 which supports the arbor 60 in the proper orientation in the element 50 and which by a set screw 74 is secured to one end of the arbor. This cap is dimensioned to contact the torque rod end 42 as will be later demonstrated.

The top plate 28 as shown in the sectional view of FIG. 2 contains a plurality of radially movable, segmental elements 76. These elements are in the form of flat plates which will slide on the bottom of an annular recess 78 in the plate and are retained in position axially by a cover plate 80 which is suitably secured in place by cap screws 82. The elements 76 are oriented circumferentially by headed slide bolts 84 which are screwed into the periphery of each segmental element and which slide radially in openings 86 in the outer wall of the top plate 28. Each segmental element 76 is urged radially inward by a compression coil spring 88.

In the operation of the device, the steps include placing a proper sized part such as a torque rod 42 in position so that it is supported by the cover plate 80. Prior to this placement or at the same time, a suitable bushing 70 is readily installed in the opening of the torque rod, this bushing being made of a rubber or a suitable rubber substitute such as neoprene or other similar resilient materials. The material is soft enough to be displaceable by radial pressure and is thus sometimes characterized as compressible. The piston rod 36 is then elevated to the point that an appropriate expander shuttle 50 can be connected thereto by the T-slot connector 48. The proper arbor 60 is then mounted in the top recess of the expander shuttle 50 with the cap 72 affixed thereto. Suitable power is then applied to the cylinder 34 so that the piston therein will pull the rod 36 downwardly. The bullet-nosed forward end of the expander shuttle 50 will then enter the central opening of the bearing element 70 and expand it, while the lower periphery thereof is supported by the segmental plates 76. As the tapered portion of the expander shuttle 50 advances downwardly, it will gradually push the plates 76 radially outward to accommodate the larger dimension of the expander element.

Thus, the position shown in FIG. 3 will be reached wherein the arbor 60 is positioned properly in an axial orientation within the bushing 70. It will be noted that at this time the thin wall of the recessed portion of the expander shuttle 50 is still within the bushing 70 and actually positioned between the arbor and the bushing. At this time the lower annular rim of the cap 72 contacts the top surface of the torque rod end 42. This stops the downward progress of the arbor 60. Further downward motion of the piston rod 36 carries the expander shuttle 50 down beyond the bushing 70 as shown in FIG. 4, thus leaving the parts suitably assembled and in proper contact. The cap 72 may then be removed and the torque rod 40 removed to make way for another assembly. The procedure is then repeated.

It will thus be seen that the rubber bushing 70 is axially and evenly supported to a considerable degree around its circumference as the expander shuttle 50 progresses through it to expand the inside diameter to the degree necessary to receive the arbor 60. As the shuttle 50 progresses downwardly, the support segment plates 76 will be in radial contact so that there is equal circumferential support around the entire rubber bushing 70. Due to the thinness of the wall of the expanding shuttle at the recess area 52, there is substantial support for the soft bushing 70 throughout the entire assembling operation.

We claim:

1. A method for assembling a hollow compressible bushing between two radially spaced, inner and outer bearing elements which comprises:

a. supporting the outer bearing element against axial displacement, b. introducing the hollow bushing into the outer bearing, c. supporting one end of the bushing circumferentially against axial displacement in one direction, d. inserting an inner bearing member within a bearing shuttle, e. moving said shuttle through the outer bearing member while expanding the bushing to a diameter larger than said inner bearing member, f. arresting the motion of the inner bearing member at a final axial orientation while still within said shuttle, and g. moving said shuttle further through said inner bearing member to withdraw it from the bushing to complete the assembly.

2. An apparatus for assembling a hollow compressible bushing between two radially-spaced, inner and outer bearing elements which comprises:

a. an axial support for an outer bearing element, b. a circumferential support for a compressible bushing positioned axially adjacent said support and having portions movable radially, c. a shuttle movable axially through said outer bearing element and said support having a recess to receive an inner bearing element, d. means to move said shuttle forceably through a bushing in said outer bearing element shaped to expand the bushing to an inner diameter greater than the outer diameter of said inner bearing element, and e. means to limit the axial motion of an inner bearing element through said outer bearing element to position said inner member in a proper axial orientation relative to said outer bearing element.

3. An apparatus as defined in claim 2 in which said circumferential support comprises a plurality of circumferentially disposed elements movable radially to accommodate an increasing diameter of said shuttle as the shuttle moves axially through the assembly.

4. An apparatus as defined in claim 2 in which said shuttle comprises an elongate member shaped in cross-section similarly to the interior configuration of said bearing elements and increasing in diameter from a forward end to a diameter slightly larger than the outer diameter of said inner bearing element and having an axial recess in a trailing end to receive and carry said inner bearing element.

5. An apparatus as defined in claim 2 in which said circumferential support comprises a supporting plate, a plurality of radially slidable segmental plates circumferentially disposed around an opening in said plate, means to guide each said plate in a radial path, and means to bias said plates radially inward.

* * * * *